April 28, 1925.

C. DAVIES, JR 1,535,109

MANUFACTURE OF IRON

Filed July 3, 1922

INVENTOR.
Caleb Davies Jr.
BY
Fay, Oberlin & Fay
ATTORNEYS

Patented Apr. 28, 1925.

1,535,109

UNITED STATES PATENT OFFICE.

CALEB DAVIES, JR., OF POLAND, OHIO.

MANUFACTURE OF IRON.

Application filed July 3, 1922. Serial No. 572,619.

*To all whom it may concern:*

Be it known that I, CALEB DAVIES, Jr., a citizen of the United States, and a resident of Poland, county of Mahoning, and State of Ohio, have invented a new and useful Improvement in the Manufacture of Iron, of which the following is a specification, the principle of the invention being herein explained and the best mode in which I have contemplated applying that principle, so as to distinguish it from other inventions.

The present invention relating, as indicated, to the manufacture of iron has more particular regard to an improved apparatus and process for making low sulphur pig iron.

In making pig iron by the reduction of iron ore in a blast furnace, as ordinarily practiced, there is in the bottom of the hearth of such furnace a layer of molten iron and above that a layer of molten slag. The distribution of sulphur between such slag layer and iron layer depends on various conditions, but whatever such conditions, the higher the sulphur content of the slag, the higher will be the sulphur content of the iron. This is apparently in accordance with well-known laws of chemical equilibrium, since the iron as formed runs down through the slag layer into the layer of previously formed iron and thus comes into intimate contact with the slag and naturally tends to reach chemical equilibrium with it.

The principal object of the present invention is to maintain a relatively low sulphur content in the above described layer of slag and in this way more effectively to cause the slag to carry the sulphur out of the furnace and thus decrease the sulphur content of the iron. Other objects include the recovery of waste heat incidentally to such desulphurizing of the slag and the recovery of sulphur from the latter in the form of sulphur dioxide. To the accomplishment of the foregoing and related ends, the invention then consists of the steps and means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Figure 1:
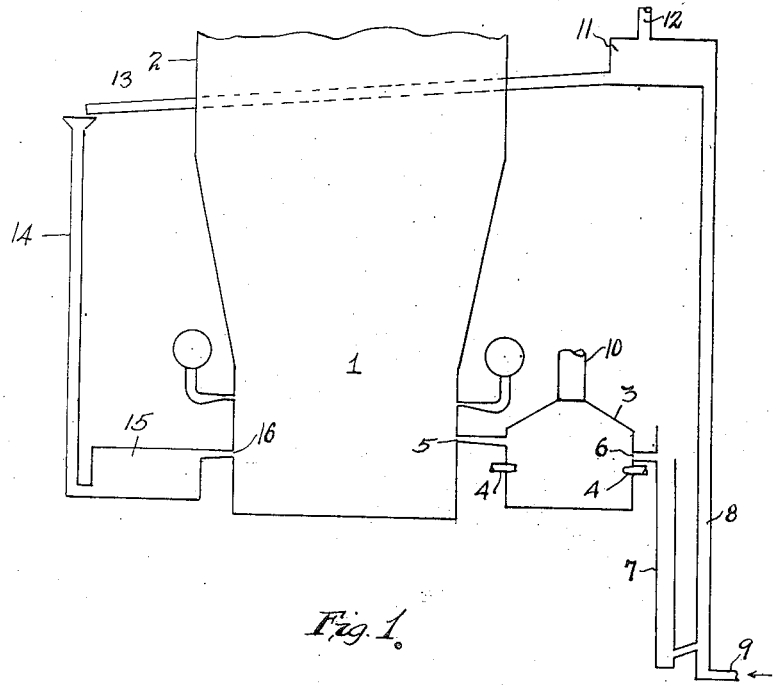
Figure 2:
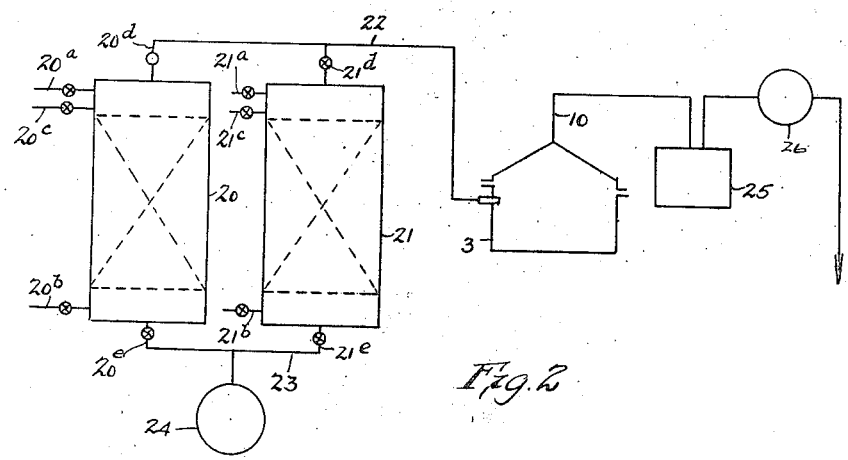

Fig. 1 is a more or less diagrammatic representation of a blast furnace equipped with one form of apparatus for carrying out my improved process; and Fig. 2 is a view wholly diagrammatic in character illustrating the arrangement of such apparatus where it is desired to recover waste heat and to use the sulphur dioxide derived from the process.

Briefly stated, my improved method or process involves the removal, either continuously or intermittently, of a portion of the slag from the blast furnace, then desulphurizing it, preferably by contact with oxidizing gases, and then returning such desulphurized slag back to the furnace. Where oxidizing gases are utilized they will, above the melting point of the slag, convert its calcium sulphide to calcium oxide and sulphur dioxide, the former remaining in solution in the slag and the latter going off as a gas. Such oxidation may be carried out either by very highly preheated air or by means of an oxidizing flame of sufficiently high temperature. In the former case the mixture of sulphur dioxide and excess hot air may be passed through a slag pocket to separate suspended slag, and thence through a waste heat boiler, following which such sulphur dioxide may be utilized in the manufacture of sulphuric acid.

The slag may be heated as well as oxidized in the desulphurizing chamber, this being due not only to the heat of combustion of the calcium sulphide, but also to the use of hot, oxidizing gas flames or to the use of air alone, where the air has been preheated (as is indicated above will be desirable) above the temperature of the slag. Such preheating of the air may be accomplished by special hot blast stoves supplied with heated air and gas, and as a result of this and of the additional heat imparted by the desulphurizing process proper, a material economy in fuel is effected by raising the temperature of the hearth.

In certain cases it may be found preferable to return the desulphurized slag to the furnace above the tuyères in order better to utilize such additional heat and also to get some additional contact with the coke and iron above the slag layer in the hearth.

In the illustrative form of apparatus appearing in Fig. 1, I show the same as applied to the lower end of hearth 1 of a typical blast furnace 2, such apparatus being designed for the continuous circulation of the slag through a desulphurizing chamber 3 and thence back into the furnace.

The desulphurizing chamber 3 is provided with tuyères 4 for the admission of air or gas or mixtures of both into the slag which enters said chamber at one side through a cinder notch 5 and overflows at the other side through an opening 6 into a well 7 that is connected with an air lift 8 preferably operated by hot air admitted at the bottom of said lift through a suitable duct 9.

After passing through the slag in chamber 3 the air with products resulting from the desulphurizing process is discharged through a duct 10 that leads from the upper end of said chamber and may thence be conducted to an acid plant as will be presently described in connection with Fig. 2.

A separator 11 is connected with the upper end of air lift 8 whence the air freed from particles of slag is discharged through an opening 12, while the desulphurized slag is returned by means of suitable ducts 13 and 14 to a brick lined seal 15 that is connected with the hearth 1 through the medium of a slag inlet 16. The design of said seal will be such as to prevent gas being blown out through duct 14 in case pressure is taken off the furnace and put back on again when the level of slag therein is below the inlet connection. In general, however, when using the present arrangement, the flushing of the furnace is carried out immediately after casting instead of before casting and in this way the maximum quantity of slag is in the furnace immediately before casting so that even after the iron has been removed from the furnace, the surface of the slag will still be above the cinder notch 5. This procedure makes it possible to maintain a low sulphur content in the slag layer at all times, instead of having to stop the circulation at casting time until more slag accumulates.

As previously indicated, I show in Fig. 2 a somewhat more elaborate apparatus in which the aforesaid slag desulphurizing apparatus proper is connected up with specifically designed means for supplying superheated air thereto, while means are also provided for recovering waste heat and utilizing the sulphur dioxide. The superheated air is alternately derived from one or the other of two chambers or "stoves" 20 and 21, the first of which is provided with two hot blast connections 20$^a$ and 20$^b$ at the top and bottom thereof, respectively, and with a gas supply connection 20$^c$ associated with such upper hot blast connection, while the second chamber is provided with a similar series of hot blast connections 21$^a$ and 21$^b$ and with a gas connection 21$^c$. A line 22 having valve-controlled connections 20$^d$ and 21$^d$ with said chambers, respectively, serves to conduct the superheated air to the desulphurizing chamber 3; and a similar line 23 having valve-controlled branch connections 20$^e$ and 21$^e$ connected with said chambers, respectively, leads to a waste heat boiler 24 or equivalent heat exchange device. During one period of operation the valves, in connections 20$^a$, 20$^c$, 20$^e$, 21$^b$ and 21$^d$ will be open, the other connections just referred to being closed; then the connections just named will be closed and connections 20$^b$, 20$^d$, 21$^a$, 21$^c$ and 21$^e$ will be open. During such first period the hot blast and gas admitted at the upper end of chamber 20 will serve to raise the latter to a high temperature and thence discharge into the waste heat boiler 24, while the hot blast admitted at the bottom of chamber 21 previously thus raised to a high temperature will pass through connection 21$^d$ and line 22 to the desulphurizing chamber. During the second period the operation just described will be reversed as to the two chambers 20 and 21.

The hot gases after passing through the desulphurizing chamber and carrying along with them the resultant sulphur dioxide pass through the separator or slag pocket 25, thence through a waste heat boiler 26 or equivalent heat exchange device to a sulphuric acid plant (not shown), where the sulphur dioxide is recovered in the form of such acid.

In place of using a continuously operating apparatus for accomplishing the desulphurizing of the slag, such as just described, the operation may be carried on intermittently by taking off the slag into ladles, desulphurizing same, and then closing said ladles and forcing the slag back into the furnace by means of air pressure in a manner similar to the use of acid eggs. Moreover, the tuyères of the desulphurizing chamber instead of entering the latter from the sides, may project downwardly from a removable cover to or into the bath of slag, in which case ladles equipped to take such cover may replace the fixedly located desulphurizing chamber. In still another arrangement a small modified Bessemer type of converter may be used as a desulphurizer, such converter having brick lined connections to take preheated air and in addition said converter may have gas connections or burners.

The slag may be rendered a more efficient carrier of sulphur by the addition of calcium carbide which will be preferably added to such slag as it is being returned to the furnace, for example, through the seal 15. However, such calcium carbide may be introduced in other ways, as through the tuyères or in the coke.

Similarly, coke may be mixed with the returning slag. This helps to maintain strongly reducing conditions, and, where the slag is returned above the level of the tuyeres, introduces hot fuel where it can be most efficiently used.

In addition to the specific methods already referred to for treating the slag while removed from the furnace hearth in order to improve its action with respect to the molten iron when again brought in contact therewith, I should note the following as applicable, viz:—(1) oxidizing such slag with iron ore, preheated ore being preferably employed; (2) adding iron ore in excess to the slag returning to the furnace, thus oxidizing some of the impurities, and especially silicon, in the iron in contact with the slag layer in the hearth; (3) heating the slag electrically while outside the blast furnace; and (4) electrolytically desulphurizing the molten slag, preferably with coke anode and molten iron or ferro-silicon cathode.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In the manufacture of pig iron, the steps which consist in withdrawing a portion of the slag from the blast-furnace hearth, desulphurizing such slag, and then returning the same to such hearth.

2. In the manufacture of pig iron, the steps which consist in withdrawing a portion of the slag from the blast-furnace hearth, bringing such slag into contact with oxidizing gases, whereby it is desulphurized, and then returning the same to such hearth.

3. In the manufacture of pig iron, the steps which consist in withdrawing a portion of the slag from the blast-furnace hearth, bringing such slag into contact with oxidizing gases, whereby the sulphur therein is converted into sulphur dioxide, returning such slag to such hearth, and then recovering such sulphur dioxide.

4. In the manufacture of pig iron, the steps which consist in withdrawing a portion of the slag from the blast-furnace hearth, bringing such slag into contact with highly preheated air, whereby the sulphur therein is converted into sulphur dioxide, thereupon utilizing such air in a waste heat recovery device, and then recovering such sulphur dioxide.

5. In the manufacture of pig iron, the steps which consist in continuously withdrawing a portion of the slag from the blast-furnace hearth, desulphurizing such slag, and returning to such hearth.

6. In the manufacture of pig iron, the steps which consist in bringing the molten iron and slag into contact under non-oxidizing conditions, desulphurizing part of such slag by oxidation out of contact with such iron, and then bringing said desulphurized slag again into contact with such iron under non-oxidizing conditions.

7. In the manufacture of pig iron, the steps which consist in maintaining a circulation of the slag from a blast-furnace exteriorly of the hearth thereof, and treating such slag while removed from such hearth to improve its action with respect to the molten iron when again brought in contact therewith.

8. In the manufacture of pig iron, the steps which consist in maintaining a circulation of the slag from a blast-furnace exteriorly of the hearth thereof, and desulphurizing such slag while removed from such hearth.

9. In the manufacture of pig iron, the steps which consist in maintaining a circulation of the slag from a blast-furnace exteriorly of the hearth thereof, and adding to such slag while removed from such hearth an ingredient adapted to render same a more efficient carrier of sulphur.

10. In the manufacture of pig iron, the steps which consist in maintaining a circulation of the slag from a blast-furnace exteriorly of the hearth thereof, and adding calcium carbide to such slag while removed from such hearth.

11. In the manufacture of pig iron, the steps which consist in maintaining a circulation of the slag from a blast-furnace exteriorly of the hearth thereof, and adding coke to such slag while removed from such hearth.

12. The combination with the hearth of a blast-furnace, of a chamber adapted to receive a portion of the slag from such hearth, means for passing a blast of deoxidizing gases through such chamber, and means for returning such slag to such hearth.

13. The combination with the hearth of a blast-furnace, of a chamber adapted to receive a portion of the slag from such hearth, means for passing a blast of deoxidizing gases through such chamber, and means for returning such slag to such hearth, said last named means including a seal whereby gas is prevented from escaping from such blast-furnace.

14. The combination with the hearth of a blast-furnace, of a chamber connected to receive a continuous stream of molten slag from such hearth, means for passing a blast of deoxidizing gases through such chamber, means for elevating such slag above such chamber, and a seal adapted to receive and return such slag to such hearth.

15. The combination with the hearth of a blast-furnace, of a chamber connected to receive a continuous stream of molten slag from such hearth, means for passing a blast of deoxidizing gases through such chamber, an air lift for elevating such slag above such chamber, and a seal adapted to receive and return such slag to such hearth.

16. The combination with the hearth of a blast-furnace, of a chamber connected to receive a continuous stream of molten slag from such hearth, two stoves adapted alternately to supply a stream of highly preheated air to said chamber, and a waste heat recovery device connected to receive the hot gases from said stoves, respectively, while being heated up.

Signed by me this 28th day of June, 1922.

CALEB DAVIES, Jr.